United States Patent
Nakamura et al.

(10) Patent No.: US 11,424,439 B2
(45) Date of Patent: Aug. 23, 2022

(54) NEGATIVE ELECTRODE OF NONAQUEOUS ELECTROLYTE SECONDARY BATTERY, AND NONAQUEOUS ELECTROLYTE SECONDARY BATTERY

(71) Applicant: DAI-ICHI KOGYO SEIYAKU CO., LTD., Kyoto (JP)

(72) Inventors: Shiho Nakamura, Kyoto (JP); Atsushi Sanuki, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 548 days.

(21) Appl. No.: 16/463,281

(22) PCT Filed: Oct. 17, 2017

(86) PCT No.: PCT/JP2017/037457
§ 371 (c)(1),
(2) Date: May 22, 2019

(87) PCT Pub. No.: WO2018/096838
PCT Pub. Date: May 31, 2018

(65) Prior Publication Data
US 2019/0312258 A1 Oct. 10, 2019

(30) Foreign Application Priority Data

Nov. 25, 2016 (JP) .............................. JP2016-228621

(51) Int. Cl.
| | | |
|---|---|---|
| H01M 4/133 | (2010.01) |
| H01M 4/134 | (2010.01) |
| H01M 4/1393 | (2010.01) |
| H01M 4/1395 | (2010.01) |
| H01M 10/0525 | (2010.01) |
| C08L 1/26 | (2006.01) |
| H01M 4/131 | (2010.01) |
| C08K 3/34 | (2006.01) |
| C08K 3/04 | (2006.01) |
| H01M 4/36 | (2006.01) |
| H01M 4/48 | (2010.01) |
| H01M 4/62 | (2006.01) |
| C08B 11/12 | (2006.01) |
| C08L 1/28 | (2006.01) |
| H01M 4/02 | (2006.01) |

(52) U.S. Cl.
CPC .............. *H01M 4/133* (2013.01); *C08K 3/04* (2013.01); *C08K 3/34* (2013.01); *C08L 1/26* (2013.01); *H01M 4/131* (2013.01); *H01M 4/134* (2013.01); *H01M 4/1393* (2013.01); *H01M 4/1395* (2013.01); *H01M 4/36* (2013.01); *H01M 4/48* (2013.01); *H01M 4/62* (2013.01); *H01M 10/0525* (2013.01); *C08B 11/12* (2013.01); *C08L 1/286* (2013.01); *H01M 2004/021* (2013.01)

(58) Field of Classification Search
CPC ............ C08L 1/286; C08L 1/282; C08L 1/08; H01M 4/62; H01M 4/621
See application file for complete search history.

(56) References Cited

U.S. PATENT DOCUMENTS

| | | | |
|---|---|---|---|
| 2008/0107789 A1* | 5/2008 | Akimoto | ............... A23L 29/262 426/573 |
| 2011/0244326 A1 | 10/2011 | Murase et al. | |
| 2016/0013473 A1 | 1/2016 | Ishiguchi | |
| 2016/0260973 A1 | 9/2016 | Sonobe et al. | |
| 2017/0162906 A1* | 6/2017 | Nakazawa | ........ H01M 10/0567 |
| 2018/0040886 A1 | 2/2018 | Yokoi et al. | |

FOREIGN PATENT DOCUMENTS

| | | | |
|---|---|---|---|
| JP | H0748401 A | * | 2/1995 |
| JP | 9-188703 A | | 7/1997 |
| JP | 2009-43678 A | | 2/2009 |
| JP | 2013-93240 A | | 5/2013 |
| JP | 2015-53152 A | | 3/2015 |
| JP | 2015-103449 A | | 6/2015 |
| JP | 2016-27561 A | | 2/2016 |
| WO | WO 2014/141552 A1 | | 9/2014 |
| WO | WO 2015/064464 A1 | | 5/2015 |
| WO | WO 2016/136178 A1 | | 9/2016 |

OTHER PUBLICATIONS

JPH0748401A Translation from Espacenet (Year: 1995).*
International Search Report for PCT/JP2017/037457 dated Dec. 5, 2017.
Written Opinion of the International Searching Authority for PCT/JP2017/037457 (PCT/ISA/237) dated Dec. 5, 2017.

* cited by examiner

*Primary Examiner* — Nathanael T Zemui
(74) *Attorney, Agent, or Firm* — Birch, Stewart, Kolasch & Birch, LLP

(57) ABSTRACT

A negative electrode of a nonaqueous electrolyte secondary battery, which is provided with a collector and a negative electrode active material layer that is formed on the collector, and which is characterized in that: the negative electrode active material layer contains a carbon-based negative electrode active material, a silicon-based negative electrode active material, a conductive agent and a predetermined carboxy methylcellulose or a salt thereof; the content of the carboxy methylcellulose or a salt thereof is from 4% by mass to 15% by mass (inclusive) relative to the total mass of the negative electrode active material layer; and the content of the silicon-based negative electrode active material relative to the total content of the carbon-based negative electrode active material and the silicon-based negative electrode active material is from 3% by mass to 19% by mass (inclusive).

6 Claims, No Drawings

NEGATIVE ELECTRODE OF NONAQUEOUS ELECTROLYTE SECONDARY BATTERY, AND NONAQUEOUS ELECTROLYTE SECONDARY BATTERY

TECHNICAL FIELD

The present invention relates to a nonaqueous electrolyte secondary battery negative electrode and a nonaqueous electrolyte secondary battery including the same.

BACKGROUND ART

Nonaqueous electrolyte secondary batteries (for example, lithium secondary batteries) having high energy density and high capacity are widely used in portable devices or the like. In order to increase the capacity of the nonaqueous electrolyte secondary battery negative electrode, studies on silicon-based negative electrode active materials have been going on (Patent Literatures 1 to 4).

CITATION LIST

Patent Literature

Patent Literature 1: JP-A-2009-043678
Patent Literature 2: JP-A-2016-027561
Patent Literature 3: JP-A-2015-103449
Patent Literature 4: JP-A-2015-053152

SUMMARY OF INVENTION

Problems that the Invention is to Solve

When the silicon-based negative electrode active material is used, because a negative electrode active material layer expands and contracts drastically during charge and discharge, a great deal of stress is applied to the negative electrode. As a result, problems such as that cracks occur in the negative electrode active material layer formed on the collector, that peeling occurs between the negative electrode active material layer and the collector, and that the apparent thickness of the negative electrode active material layer increases, arise. There are many studies to solve the above problems. For example, in a case of using a negative electrode active material of a graphitic material alone, PVDF is used in a solvent-based formulation, and CMC and SBR are used in combination in a water-based formulation; while in a case of using a negative electrode active material in combination with a silicon-based negative electrode active material, an alkoxysilyl group-containing resin (Patent Literature 1) or polyamide imide (Patent Literature 2) is used in the solvent-based formulation, and an amine salt of polyacrylic acid (Patent Literature 3) or a binder using polyacrylic acid and CMC in combination (Patent Literature 4) is used in the water-based formulation. In these formulations, in order to exhibit the necessary characteristics as a nonaqueous electrolyte secondary battery, the need for thermosetting treatment of the binder, and the complexity of the formulation such as using a plurality of binders in combination, have become issues.

Accordingly, an object of the present invention is to provide a nonaqueous electrolyte secondary battery negative electrode (hereinafter, simply referred to as negative electrode) which is a water-based formulation with low environmental burden and a simple formulation and can be produced by a process not requiring thermosetting treatment, and a nonaqueous electrolyte secondary battery including the negative electrode with an excellent cycle life.

Solution to Problem

The present invention provides the following [1] to [4].
[1] A nonaqueous electrolyte secondary battery negative electrode, including:
  a collector; and
  a negative electrode active material layer formed on the collector, in which
  the negative electrode active material layer contains a carbon-based negative electrode active material, a silicon-based negative electrode active material, a conductive agent, and carboxymethyl cellulose or a salt thereof,
  the carboxymethyl cellulose or a salt thereof has a degree of etherification of 0.4 to 2.0, has a 2 mass % aqueous solution viscosity (at 25° C., with a B-type viscometer) of 1000 mPa·s or less, has a PVI value of 0.5 or less, and has a structural viscosity of 50 or more,
  a content of the carboxymethyl cellulose or a salt thereof is 4 mass % to 15 mass % relative to a total mass of the negative electrode active material layer, and
  a content of the silicon-based negative electrode active material is 3 mass % to 19 mass % relative to a total content of the carbon-based negative electrode active material and the silicon-based negative electrode active material.
[2] The nonaqueous electrolyte secondary battery negative electrode according to [1], in which the carboxymethyl cellulose or a salt thereof is obtained by a method including the following steps:
  (step 1) a step of producing an alkaline cellulose from a cellulosic raw material by performing a reaction in a water-containing organic solvent (total amount: 100 mass %) containing 10 mass % to 15 mass % of an alkali metal hydroxide, using 1.0 mol to 5.0 mol of sodium hydroxide per mole of a glucose unit of the cellulosic raw material at 30° C. to 40° C. for a time period of 50 minutes to 80 minutes;
  (step 2) a step of etherifying the obtained alkaline cellulose by adding an etherifying agent at 30° C. to 40° C. for a time period of 50 minutes to 80 minutes, and performing an etherification reaction at 70° C. to 100° C. for 50 minutes to 120 minutes; and
  (step 3) a step of obtaining a carboxymethyl cellulose or a salt thereof by adding hydrogen peroxide to the carboxymethyl cellulose or a salt thereof obtained in the above steps 1 and 2 in a reaction system of pH 7.0 or higher, and reducing a viscosity at 80° C. to 120° C. for 80 minutes to 100 minutes.
[3] The nonaqueous electrolyte secondary battery negative electrode according to claim 1 or 2, in which the silicon-based negative electrode active material is one or more selected from silicon, a silicon alloy, and a silicon oxide represented by $SiO_x$ (where x represents $0.5 \leq x \leq 1.6$).
[4] A nonaqueous electrolyte secondary battery, including:
  a negative electrode;
  a positive electrode;
  a separator disposed between the negative electrode and the positive electrode; and
  an electrolytic solution, in which
  the negative electrode is the nonaqueous electrolyte secondary battery negative electrode according to any one of claims 1 to 3.

Advantageous Effects of Invention

The present invention can provide a nonaqueous electrolyte secondary battery negative electrode that is a water-based formulation with low environmental burden and a simple formulation and can be produced by a process not requiring thermosetting treatment, and a nonaqueous electrolyte secondary battery with an excellent cycle life.

EMBODIMENTS FOR CARRYING OUT THE INVENTION

Hereinafter, embodiments of the present invention will be described in detail.

The nonaqueous electrolyte secondary battery negative electrode according to the present embodiment includes a collector and a negative electrode active material layer formed on the collector.

Any electron conductor not adversely influencing the composed battery can be used as the collector. For example, copper, stainless steel, nickel, aluminum, titanium, calcined carbon, a conductive polymer, conductive glass, and an Al—Cd alloy can be used. In addition, those obtained by treating the surface of copper with carbon, nickel, titanium or silver can be used in order to improve adhesiveness, conductivity and oxidation resistance. Surfaces of the above materials for the collector can also be oxidized. In addition, as to the shape of the collector, a film shape, a sheet shape, a net shape, a punched or expanded product, and a molded body such as a lath body, a porous body and a foam are also used, in addition to a foil shape. The thickness of the collector is not particularly limited, and collectors with the thickness of 1 μm to 100 μm are usually used.

The negative electrode active material layer contains a carbon-based negative electrode active material, a silicon-based negative electrode active material, a conductive agent, and carboxymethyl cellulose or a salt thereof.

The carbon-based negative electrode active material is not particularly limited as long as it is a material containing carbon (atoms) and capable of electrochemically absorbing and desorbing lithium ions. Examples of the carbon-based negative electrode active material include graphite active materials (such as artificial graphite, natural graphite, a mixture of artificial graphite and natural graphite, and natural graphite coated with artificial graphite). A combination of two or more of the above active materials can also be used.

The silicon-based negative electrode active material is a material containing silicon (atoms) and capable of electrochemically absorbing and desorbing lithium ions. Examples of the silicon-based negative electrode active material include fine particles of the silicon simple substance, and fine particles of a silicon compound. The silicon compound is not particularly limited as long as it is used as a negative electrode active material of a lithium ion secondary battery, and specific examples thereof include a silicon oxide and a silicon alloy. Among these, one or more selected from silicon, a silicon alloy, and a silicon oxide represented by $SiO_x$ (in which x represents $0.5 \leq x \leq 1.6$) are preferred.

As the conductive agent, any electron conductive material not adversely influencing the battery performance can be used without particular limitation. Usually, carbon black such as acetylene black or ketjen black is used. Conductive materials including natural graphite such as flake graphite, flaky graphite and earthy graphite, artificial graphite, carbon whiskers, carbon nanotubes and derivatives thereof, carbon fibers or metal (such as copper, nickel, aluminum, silver and gold) powders, metal fibers, conductive ceramic materials may be used. Among these conductive materials, carbon black such as acetylene black and ketjen black, natural graphite such as flake graphite, flaky graphite and earthy graphite, carbon nanotubes and derivatives thereof, and carbon fibers are preferred. A mixture of two or more of the above materials can also be used. The amount of the conductive agent to be added is preferably 0.1 mass% to 30 mass% and particularly preferably 0.2 mass% to 20 mass%, relative to the amount of the negative electrode active material.

The carboxymethyl cellulose or a salt thereof has a structure in which a hydroxyl group in a glucose residue constituting a cellulose is substituted by a carboxymethyl ether group, and may have a form having a carboxyl group, or may have a form of a metal carboxylate such as a sodium salt, or may have both forms. Examples of the metal salt include alkali metal salts such as a sodium salt, a lithium salt and a potassium salt.

The carboxymethyl cellulose or a salt thereof has a degree of etherification of 0.4 to 2.0. In a case where the degree of etherification is less than the above range, the solubility in water is lowered, and in a case where the degree of etherification is larger than the above range, the amount of the etherifying agent to be used increases and the cost during production increases. The lower limit of the degree of etherification is preferably 0.5 or more and more preferably 0.6 or more. On the other hand, the upper limit thereof is preferably 1.2 or less, and more preferably 1.0 or less.

The carboxymethyl cellulose or a salt thereof has a 2 mass% aqueous solution viscosity (at 25° C., with a B-type viscometer) of 1000 mPa·s or less. When the 2 mass% aqueous solution viscosity is set within the above range, in a case of producing a negative electrode having a high content of the carboxymethyl cellulose or a salt thereof, it is easy to prepare an aqueous solution with a high concentration of the carboxymethyl cellulose or a salt thereof. The upper limit of the 2 mass% aqueous solution viscosity is preferably 50 mPa·s or less, and more preferably 40 mPa·s or less.

The carboxymethyl cellulose or a salt thereof has a PVI value of 0.5 or less, and a structural viscosity of 50 or more. When the carboxymethyl cellulose or a salt thereof are set within the above ranges, the binding property between the negative electrode active material and the collector, and the prevention of deterioration in electrodes due to the expansion and contraction of the silicon-based negative electrode active material during charge and discharge are more excellent. The upper limit of the PVI value is preferably 0.50 or less, and more preferably 0.45 or less. The lower limit of the structural viscosity is preferably 50 or more, and more preferably 60 or more. The PVI value and the structural viscosity in the present invention indicate numerical values defined and measured in Examples below.

The carboxymethyl cellulose or a salt thereof can be produced by a general method for producing the carboxymethyl cellulose or a salt thereof. That is, the carboxymethyl cellulose or a salt thereof can be produced by performing an alkaline cellulose formation reaction in which alkali is reacted with cellulose, and then adding an etherifying agent to the obtained alkaline cellulose to perform an etherification reaction. For example, the carboxymethyl cellulose or a salt thereof can be produced by performing an alkaline cellulose formation reaction using a mixed solvent containing water and an organic solvent, then adding monochloroacetic acid to perform an etherification reaction, thereafter neutralizing excess alkali with an acid, removing the mixed solvent, washing and drying the obtained solid component, and pulverizing the solid component.

A method of manufacturing the carboxymethyl cellulose or a salt thereof preferably comprises the following steps.

(Step 1) Alkaline Cellulose Formation Reaction Step

The alkaline cellulose formation reaction step in the present invention is preferably performing a reaction in a water-containing organic solvent (total amount: 100 mass %) containing 10 mass % to 15 mass % of an alkali metal hydroxide, using 1.0 mol to 5.0 mol of an alkali metal hydroxide per mole of a glucose unit of a cellulosic raw material at 30° C. to 40° C. for a time period of 50 minutes to 80 minutes.

Examples of the alkali metal hydroxide include lithium hydroxide, sodium hydroxide, and potassium hydroxide, and any one or two or more of the above can be used in combination. When the added amount of the alkali metal hydroxide is less than 1.0 mol, it is difficult to obtain the carboxymethyl cellulose or a salt thereof having a degree of etherification of 0.4 or more. Further, the crystallized region of the cellulosic raw material is not sufficiently destroyed, and the acceleration of the carboxymethyl etherification reaction is insufficient. On the other hand, when the added amount of the alkali metal hydroxide is greater than 5 mol per one mole of the glucose unit, the excess alkali metal salt decomposes the etherifying agent in the etherification reaction, and thereby the effective utilization of the etherifying agent is lowered.

The water-containing organic solvent is a mixed solvent of a given organic solvent and water. The organic solvent generally used for producing carboxymethyl cellulose or a salt thereof can be used as the organic solvent. The water-containing organic solvent is not particularly limited and specific examples thereof include: alcohol solvents such as ethyl alcohol, methyl alcohol, n-propyl alcohol, isopropyl alcohol, n-butyl alcohol and isobutyl alcohol; ketone solvents such as acetone, diethyl ketone and methyl ethyl ketone; dioxane;

and diethyl ether. The above solvents can be used alone or used as a mixture of two or more thereof. Among these, a monohydric alcohol having 1 to 4 carbon atoms is preferred, and a monohydric alcohol having 1 to 3 carbon atoms is more preferred, due to excellent compatibility with water.

The content ratio of water relative to 100 parts by mass of the organic solvent in the water-containing organic solvent is not particularly limited, and is preferably 20 parts by mass to 60 parts by mass. The lower limit of the content of water is preferably 25 parts by mass or more, and more preferably 30 parts by mass or more. In addition, the upper limit of the content of water is more preferably 50 parts by mass or less.

The alkaline cellulose formation reaction is preferably performed at a reaction temperature of 30° C. to 40° C. in order to impart the non-Newtonian property to an aqueous solution of the carboxymethyl cellulose or a salt thereof. When the reaction time is shorter than 50 minutes, the alkaline cellulose formation reaction does not proceed sufficiently, and the transparency of the resulting CMC-Na aqueous solution tends to decrease. When the reaction time is longer than 80 minutes, the degree of polymerization of the cellulosic raw material is lowered, making it difficult to obtain highly viscous carboxymethyl cellulose or a salt thereof.

The alkaline cellulose formation step can be performed using a reactor capable of mixing and stirring the above components while controlling the temperature, and various reactors conventionally used for the alkaline cellulose formation reaction can be used.

(Step 2) Etherification Reaction Step

The etherification reaction in the present invention preferably includes adding an etherifying agent at 30° C. to 40° C. for a time period of 50 minutes to 80 minutes, and performing an etherification reaction at 70° C. to 100° C. for 50 minutes to 120 minutes.

Examples of the etherifying agent include monochloroacetic acid, sodium monochloroacetate, methyl monochloroacetate, ethyl monochloroacetate, and isopropyl monochloroacetate.

The amount of the etherifying agent to be added is suitably set according to the set degree of etherification of the carboxymethyl cellulose or a salt thereof.

In the etherification reaction, it is preferable to add the etherifying agent at 30° C. to 45° C. and more preferably 30° C. to 40° C. for 50 minutes to 80 minutes, and it is preferable to raise the temperature to 70° C. to 100° C. for 30 minutes or longer and more preferably 40 minutes or longer, so as to further perform the etherification reaction for 50 minutes to 120 minutes. Under the above conditions, the addition of the etherifying agent and the etherification reaction are preferably performed in order to impart the non-Newtonian property to an aqueous solution of the carboxymethyl cellulose or a salt thereof. The etherification step may be performed using the reactor used for the alkaline cellulose formation reaction as it is, or may be performed using another reactor capable of mixing and stirring the above components while controlling the temperature.

(Step 3) Viscosity Reduction Step

In producing the salt of the carboxymethyl cellulose in the present invention, it is preferred that hydrogen peroxide is added to the carboxymethyl cellulose or a salt thereof obtained after the etherification step in a reaction system of pH 7.0 or higher, and the viscosity is reduced at 80° C. to 120° C. for 80 minutes to 100 minutes.

The amount of the hydrogen peroxide added in the viscosity reduction step is preferably 0.1 mass % to 10 mass % relative to the raw material carboxymethyl cellulose sodium salt. In order to be uniform, it is preferable to use spraying as the addition method. In the viscosity reduction step, hydrogen peroxide can be used in a form of an aqueous solution with a concentration of 20 w/v %.

The above viscosity reduction step is preferably performed for 80 minutes to 100 minutes under the conditions of a reaction temperature of 80° C. to 120° C. in order to impart the non-Newtonian property to an aqueous solution of the carboxymethyl cellulose sodium salt.

The excess alkali of the carboxymethyl cellulose or a salt thereof after the viscosity reduction step is neutralized with an acid, then the water-containing organic solvent is removed, and the obtained product is washed, dried and pulverized, so as to produce the carboxymethyl cellulose or a salt thereof according to the present invention.

In the negative electrode active material layer, the content of the carboxymethyl cellulose or a salt thereof is 4 mass % to 15 mass %. When the content is within the above range, deterioration in the electrode due to expansion and contraction of the negative electrode active material layer during charge and discharge can be prevented, and the excellent effect that the electrode crack due to contraction during the drying does not occur is obtained, even when only the carboxymethyl cellulose or a salt thereof is added as a binder. The lower limit of the content is preferably 5 mass % or more, and more preferably 6 mass % or more. On the other hand, the lower limit of the content is preferably 12 mass % or less, and more preferably 10 mass % or less.

In the negative electrode active material layer, the content of the carbon-based negative electrode active material is not particularly limited and specifically, is preferably 60 mass % or more. When the content is within the above range, there is a merit that it is excellent in preventing deterioration in the electrode due to expansion and contraction of the negative electrode active material layer during charge and discharge. The content is more preferably 70 mass % or more.

In the negative electrode active material layer, the content of the silicon-based negative electrode active material is preferably 5 mass % to 25 mass % relative to the carbon-based negative electrode active material. When the content is within the above range, the capacity of the electrode can be increased while preventing deterioration in the electrode due to expansion and contraction of the negative electrode active material layer during charge and discharge. The lower limit of the content is more preferably 10 mass % or more, and the upper limit of the content is more preferably 20 mass % or less.

The content of the silicon-based negative electrode active material is 3 mass % to 19 mass % relative to the total content of the carbon-based negative electrode active material and the silicon-based negative electrode active material. When the content of the silicon-based negative electrode active material is within the above range, the capacity of the electrode can be increased while preventing deterioration in the electrode due to expansion and contraction of the negative electrode active material layer during charge and discharge. The lower limit of the content is more preferably 4 mass % or more.

In the negative electrode active material layer, the content of the conductive agent is not particularly limited and specifically, is preferably 0.5 mass % to 10 mass %. When the content is within the above range, the conductivity of the electrode is improved and the dispersion by the carboxymethyl cellulose or a salt thereof is improved. The lower limit of the content is more preferably 1 mass % or more, and the upper limit of the content is more preferably 5 mass % or less.

The carbon-based negative electrode active material, the silicon-based negative electrode active material and the conductive agent are sequentially added to and mixed with an aqueous solution of the carboxymethyl cellulose or a salt thereof, and water is added thereto for dilution, so as to prepare a slurry or pasty electrode composition. The electrode composition is coated onto a collector and the water is volatilized to form a nonaqueous electrolyte secondary battery negative electrode. The nonaqueous electrolyte secondary battery negative electrode may also be formed by dry-mixing the carbon-based negative electrode active material, the silicon-based negative electrode active material and the conductive agent, and then, to the above mixture, adding and mixing an aqueous solution of the carboxymethyl cellulose or a salt thereof dissolved in water, so as to prepare a slurry or pasty electrode composition.

The nonaqueous electrolyte secondary battery according to the present invention includes the above nonaqueous electrolyte secondary battery negative electrode as a negative electrode. The structure of the nonaqueous electrolyte secondary battery according to one embodiment is not particularly limited. For example, the nonaqueous electrolyte secondary battery may include a positive electrode, a negative electrode, a separator, and a nonaqueous electrolyte, and the electrode according to the present embodiment is used for either or both of the positive electrode and the negative electrode. In one embodiment, the battery may include a laminate in which positive electrodes and negative electrodes are alternately laminated via a separator, a container for containing the laminate, and a nonaqueous electrolyte such as an electrolytic solution injected into the container.

EXAMPLES

Next, Examples will be described together with Comparative Examples. However, the present invention is not limited to Examples. In Examples, "%" means mass basis unless otherwise specified particularly.

[Production of Carboxymethyl Cellulose Sodium Salt]

[Production Example 1] (Examples 1 and 2, and Comparative Examples 6 and 7)

To a 3-liter kneader-type reactor equipped with a twin-screw stirring blade, 100 g of low density pulp pulverized with a household mixer was charged. 60 g of sodium hydroxide was dissolved in 500 g of a water-containing organic solvent in which IPA: water was mixed at a mass ratio of 80:20. Then, the solvent was charged into the reactor charged with the pulp and stirred at 35° C. for 60 minutes to perform an alkaline cellulose formation reaction, and an alkaline cellulose was obtained. Next, 55 g of monochloroacetic acid was dissolved in 32.7 g of the above water-containing organic solvent, and the solvent temperature was adjusted to 25° C. Thereafter the alkaline cellulose was added thereto for 60 minutes while maintaining at 35° C. Then, the temperature was raised to 80° C. by taking 30 minutes, and the etherification reaction was performed at 80° C. for 50 minutes.

After the etherification reaction, 5 g of a 20% aqueous hydrogen peroxide solution was added, and a viscosity reduction reaction was performed at 100° C. for 90 minutes. After the viscosity reduction reaction, the unreacted excess sodium hydroxide was neutralized with 50 wt % acetic acid, and the pH was made to 6.5 to 7.5. The neutralized product in a slurry form was taken out of the reactor, and IPA was removed by centrifugation to obtain a crude carboxymethyl cellulose sodium salt. The crude carboxymethyl cellulose sodium salt was washed with a 70 wt % aqueous methanol solution to remove by-products, that is, sodium chloride, sodium glycolate and sodium acetate. This washing operation was repeated twice, and then the washed product was dried at 90° C. to 105° C. for 4 hours and pulverized to obtain the carboxymethyl cellulose sodium salt.

Various physical properties of the obtained carboxymethyl cellulose sodium salt were measured by the below measurement methods. As a result, the degree of etherification was 0.75, the 2 mass% aqueous solution viscosity was 15 mPa·s, the PVI value was 0.42, and the structural viscosity was 64.

[Production Examples 2 to 6]

Carboxymethyl cellulose sodium salts of Production Examples 2 to 6 were obtained by production in the same manner as in Production Example 1, except that the charging amount of sodium hydroxide, the condition of the alkaline cellulose formation reaction, the charging amount of monochloroacetic acid, the amount of the water-containing organic solvent dissolving monochloroacetic acid, the addition condition of monochloroacetic acid, the condition of the etherification reaction and the condition of the viscosity reduction step were changed to those shown in Table 1. The various physical properties of the carboxymethyl cellulose sodium salts were measured by the below measurement methods. The measurement results are also shown in Table 1.

[Measurement of Physical Properties of Carboxymethyl Cellulose Sodium Salt]

<Degree of Etherification>

0.6 g of the carboxymethyl cellulose sodium salt was dried at 105° C. for 4 hours. After precisely weighing the mass of the dried mass, the dried mass was wrapped in filter paper and incinerated in a porcelain crucible. The obtained ash was transferred to a 500 ml beaker, 250 ml of water and 35 ml of a 0.05 mol/l aqueous sulfuric acid solution were added thereto, and the mixture was boiled for 30 minutes. After cooling, the excess acid was subjected to back titration with a 0.1 mol/l aqueous potassium hydroxide solution. Phenolphthalein was used as an indicator. The degree of etherification was calculated based on the following (Equation 1) using the measurement results.

$$(\text{Degree of etherification}) = 162 \times A/(10000 - 80A) \quad \text{(Equation 1)}$$

$$A = (af - bfl)/\text{weight of dried mass (g)}$$

A: amount (ml) of 0.05 mol/l aqueous sulfuric acid solution consumed by bound alkali in 1 g of sample a: amount of 0.05 mol/l aqueous sulfuric acid solution (ml) used f: titer of 0.05 mol/l aqueous sulfuric acid solution b: titration volume (ml) of 0.1 mol/l aqueous potassium hydroxide solution fl: titer of 0.1 mol/l aqueous potassium hydroxide solution <2 mass % Aqueous Solution Viscosity>

The carboxymethyl cellulose sodium salt (about 4.4 g) was put in a stoppered 300 ml Erlenmeyer flask to conduct precise weighing. The amount of water calculated by the formula "sample (g)×(99−water content (mass %))" was added thereto, and the mixture was allowed to stand for 12 hours and further mixed for 5 minutes. Using the resultant solution, the viscosity at 25° C. was measured using a BM-type viscometer (single cylindrical rotation viscometer) according to JIS Z8803. At that time, (a) the viscosity was measured at a rotor rotation speed of 60 rpm; (b) in a case where the measured value in the above (a) was 8000 mPa·s or more, the rotor speed was changed to 30 rpm; (c) in a case where the measured value in the above (b) was 16000 mPa·s or more, the rotor speed was changed to 12 rpm.

<PVI Value>

The carboxymethyl cellulose sodium salt was used to prepare an aqueous solution having a viscosity of 10000±500 mPa·s, and the solution was mixed well. Then, the mixture was covered with a wrap, and left overnight in a 25° C. thermostat. Next, the mixture was taken out of the thermostat and stirred fully with a glass stick. Subsequently, the viscosity was measured at a rotation speed of 2 rpm using a BH-type viscometer and a NO. 5 rotor ($\eta 2$). Next, the viscosity was measured at a rotation speed of 20 rpm ($\eta 20$). Based on these measured values, the PVI value was calculated by the following (Equation 2). The PVI value is closer to 1.0 to be more Newtonian, and to be closer to 0 is more non-Newtonian.

$$\text{PVI*} = \eta 20/\eta 2 \quad \text{(Equation 2)}$$

*Printing Viscosity Index

<Structural Viscosity>

The carboxymethyl cellulose sodium salt was used to prepare an aqueous solution having a viscosity of 10000±500 mPa·s, and the solution was mixed well. Then, the mixture was covered with a wrap, and left overnight in a 25° C. thermostat. Next, the mixture was taken out of the thermostat and the viscosity at 20 rpm was measured using a BH-type viscometer and a NO. 5 rotor ($\eta M$). Subsequently, after stirring at 400 rpm for 10 minutes using a three-one motor, the viscosity at 20 rpm was measured using a BH-viscometer and a NO. 5 rotor ($\eta m$). The structural viscosity was calculated by the following (Equation 3) using each measured viscosity.

$$\text{Structural viscosity (\%)} = (\eta V - \eta m)/\eta M \quad \text{(Equation 3)}$$

TABLE 1

| | Production Example 1 | Production Example 2 | Production Example 3 | Production Example 4 | Production Example 5 | Production Example 6 |
|---|---|---|---|---|---|---|
| Pulp (g) | 100 | 100 | 100 | 100 | 100 | 100 |
| Water-containing organic solvent (g) | 500.0 | 500.0 | 500.0 | 500.0 | 500.0 | 500.0 |
| Sodium hydroxide (g) | 60.0 | 45.0 | 65.0 | 65.0 | 60.0 | 60.0 |
| Alkaline cellulose formation reaction temperature (° C.) | 35.0 | 35.0 | 35.0 | 35.0 | 35.0 | 35.0 |
| Alkaline cellulose formation reaction time (minute) | 60.0 | 30.0 | 30.0 | 40.0 | 60.0 | 60.0 |
| Monochloroacetic acid (g) | 55.0 | 55.0 | 110.0 | 75.3 | 52.1 | 55.0 |
| Water-containing organic solvent (g) | 32.7 | 32.7 | 65.4 | 44.7 | 31.0 | 32.7 |
| Addition temperature of monochloroacetic acid solution (° C.) | 35 | 50 | 45 | 50 | 35 | 35 |
| Addition time of monochloroacetic acid solution (minute) | 60 | 40 | 90 | 40 | 60 | 60 |
| Etherification reaction temperature (° C.) | 80 | 80 | 80 | 80 | 80 | 80 |
| Etherification reaction time (minute) | 50 | 50 | 120 | 50 | 50 | 50 |
| Amount of 20% peroxide solution (g) | 5 | 5 | 5 | 5 | 1.5 | — |
| Viscosity reduction step temperature (° C.) | 100 | 100 | 100 | 100 | 100 | — |
| Viscosity reduction step time (minute) | 90 | 90 | 90 | 90 | 90 | — |

TABLE 1-continued

| | Production Example 1 | Production Example 2 | Production Example 3 | Production Example 4 | Production Example 5 | Production Example 6 |
|---|---|---|---|---|---|---|
| PVI value | 0.42 | 0.48 | 0.71 | 0.59 | 0.46 | 0.48 |
| Structural viscosity | 64 | 19 | 56 | 3.5 | 180 | 93 |
| Degree of etherification | 0.75 | 0.72 | 0.92 | 0.9 | 0.66 | 0.74 |
| 2 mass % aqueous solution viscosity | 15 | 18 | 22 | 20 | 100 | 750 |

[Preparation of Negative Electrode]

Example 1

To 50 parts by mass of a 12 mass % of an aqueous solution of the carboxymethyl cellulose sodium salt obtained in Production Example 1, 9.1 parts by mass of SiO (hereinafter referred to as "$SiO_x$"), which was subjected to a disproportionation reaction by heat treatment at 1000° C. under a reduced pressure, was mixed. The mixture was stirred for 10 minutes at a rotation speed of 40 rpm with a rotation/revolution stirrer. Then 1.5 parts by mass of carbon black and 1.5 parts by mass of carbon nanotubes, as a conductive agent, were added thereto, and the obtained mixture was stirred for 10 minutes at a rotation speed of 40 rpm. Further, 81.9 parts by mass of natural graphite was added in three portions, and each time the obtained mixture was stirred for 10 minutes at a rotation speed of 40 rpm. Thereafter, 54 parts by mass of distilled water was added in three portions, and each time the obtained mixture was stirred for 10 minutes at a rotation speed of 40 rpm to obtain a negative electrode slurry. The obtained slurry was coated onto a copper foil (10 µm in thickness) by a coating machine, and after preliminary drying at 100° C., vacuum drying was performed at 130° C. for 8 hours. The electrode obtained by drying was pressure-molded by a roller press to form a negative electrode mixture layer having a thickness of 30 µm on one side of the copper foil. Thereafter, the negative electrode mixture layer was circularly punched by a φ12 mm punching machine to obtain a negative electrode 1 for evaluation.

Comparative Example 1

A negative electrode 2 for evaluation was obtained by performing the same procedure as in Example 1, except that the carboxymethyl cellulose sodium salt obtained in Production Example 1 was changed to the carboxymethyl cellulose sodium salt obtained in Production Example 2.

Comparative Example 2

A negative electrode 3 for evaluation was obtained by performing the same procedure as in Example 1, except that the carboxymethyl cellulose sodium salt obtained in Production Example 1 was changed to the carboxymethyl cellulose sodium salt obtained in Production Example 3.

Comparative Example 3

A negative electrode 4 for evaluation was obtained by performing the same procedure as in Example 1, except that the carboxymethyl cellulose sodium salt obtained in Production Example 1 was changed to the carboxymethyl cellulose sodium salt obtained in Production Example 4.

Example 2

A negative electrode slurry was obtained by performing the same operation as in Example 1, except that the concentration of the aqueous solution of the carboxymethyl cellulose sodium salt obtained in Production Example 1 was changed to 10 mass %. 54 parts by mass of distilled water was added to the negative electrode slurry in three portions to dilute the slurry, then 2 parts by mass of a 50 mass % aqueous dispersion of a styrene butadiene rubber (SBR) was added thereto, and the mixture was stirred for 10 minutes at a rotation speed of 20 rpm to obtain a negative electrode slurry having a solid content of 50 mass %. A negative electrode 5 for evaluation was obtained by performing the same operation as in Example 1 using the negative electrode slurry.

Comparative Example 4

A negative electrode 6 for evaluation was obtained by performing the same procedure as in Example 1, except that the carboxymethyl cellulose sodium salt obtained in Production Example 1 was changed to the carboxymethyl cellulose sodium salt obtained in Production Example 5, and the concentration of the aqueous solution was changed to 4 mass %.

Comparative Example 5

A negative electrode slurry was obtained by performing the same procedure as in Example 1, except that the carboxymethyl cellulose sodium salt obtained in Production Example 1 was changed to the carboxymethyl cellulose sodium salt obtained in Production Example 6, and the concentration of the aqueous solution was changed to 4 mass%. 51 parts by mass of distilled water was added to the negative electrode slurry in three portions to dilute the slurry, then 2 parts by mass of a 50 mass% aqueous dispersion of a styrene butadiene rubber (SBR) was added thereto, and the mixture was stirred for 10 minutes at a rotation speed of 20 rpm. A negative electrode 7 for evaluation was obtained by performing the same operation as in Example 1 using the negative electrode slurry.

Comparative Example 6

A negative electrode 8 for evaluation was obtained by performing the same operation as in Example 1 except that 18.2 parts by mass of $SiO_x$ and 72.8 parts by mass of natural graphite were used.

Comparative Example 7

A negative electrode 9 for evaluation was obtained by performing the same operation as in Example 1 except that 27.3 parts by mass of $SiO_x$ and 63.7 parts by mass of natural graphite were used.

[Preparation of Lithium Ion Secondary Battery]

The negative electrode obtained above, a separator (Celgard 2325 manufactured by Thank Metal Co., Ltd.), and lithium metal (φ15 mm) as a working electrode were disposed in this order at predetermined positions in a TJ-AC coin cell manufactured by Nippon Tomuseru Co., Ltd. Further, an electrolytic solution obtained by adding vinylene carbonate to a mixed solution of ethylene carbonate containing 1 mol/L of $LiPF_6$, and methyl ethyl carbonate was poured, to prepare a lithium ion secondary battery.

<Property Evaluation>

The initial charge and discharge properties were examined as follows. In an atmosphere of 20° C., charging was performed under constant current and constant voltage conditions until the voltage value reached 0.01 V at a current value of 0.1 C obtained based on the theoretical capacity of the negative electrode, and the charging was stopped when the current value dropped to 0.05 C. Next, discharging was performed until the voltage relative to metal Li reached 1.0 V under the condition of a current value of 0.1 C, and the initial discharge capacity was measured. The charge and discharge cycle was repeated again, and the second discharge capacity was measured.

The cycle properties were examined as follows. In an atmosphere of 20° C., charging was performed under constant current and constant voltage conditions until the voltage value reached 0.01 V at a current value of 0.2 C obtained based on the second discharge capacity, and the charging was stopped when the current value dropped to 0.05 C. Next, discharge was performed under the condition of a current value of 1 C until the voltage relative to the metal Li reached 1.0 V. Charge and discharge were performed until the total number of cycles reached 100, and the discharge capacity was measured each time. Finally, the discharge capacity at the 50th and 100th cycles was divided by the discharge capacity at the first cycle to calculate the capacity retention rate (%). The results are shown in Table 2 below.

TABLE 2

| | Negative electrode type | Carboxymethyl cellulose sodium salt type | Electrode capacity (mAh/g) | Capacity retention rate after 100 cycles (%) |
|---|---|---|---|---|
| Example 1 | Negative electrode 1 | Production Example 1 | 464.0 | 86.3 |
| Comparative Example 1 | Negative electrode 2 | Production Example 2 | 462.0 | 80.2 |
| Comparative Example 2 | Negative electrode 3 | Production Example 3 | 476.0 | 80.6 |
| Comparative Example 3 | Negative electrode 4 | Production Example 4 | 476.0 | 75.3 |
| Example 2 | Negative electrode 5 | Production Example 1 | 466.0 | 80.2 |
| Comparative Example 4 | Negative electrode 6 | Production Example 5 | 475.0 | 77.1 |
| Comparative Example 5 | Negative electrode 7 | Production Example 6 | 473.0 | 78.8 |
| Comparative Example 7 | Negative electrode 8 | Production Example 1 | 603.6 | 61.6 |
| Comparative Example 8 | Negative electrode 9 | Production Example 1 | 686.6 | 36.0 |

As seen from Table 2, in a case where the structural viscosity of the carboxymethyl cellulose sodium salt was low (Comparative Examples 1 and 3) or the PVI value was high (Comparative Examples 2 and 3), it is revealed that the capacity retention rate after 100 cycles was lowered.

In addition, in a case where the content of the carboxymethyl cellulose sodium salt in the electrode was small (Comparative Examples 4 and 5), it is revealed that the capacity retention rate was also lowered.

Further, in a case where the content of the silicon-based negative electrode active material was large relative to the total amount of the content of the carbon-based negative electrode active material and the silicon-based negative electrode active material (Comparative Examples 6 and 7), it was found that the electrode capacity became large, but the capacity retention rate after 100 cycles was extremely lowered.

INDUSTRIAL APPLICABILITY

The nonaqueous electrolyte secondary battery negative electrode according to the present invention and the nonaqueous electrolyte secondary battery including the same can be widely used for portable devices or the like.

The invention claimed is:

1. A nonaqueous electrolyte secondary battery negative electrode, comprising:
    a collector; and
    a negative electrode active material layer formed on the collector, wherein
    the negative electrode active material layer contains a carbon-based negative electrode active material, a silicon-based negative electrode active material, a conductive agent, and carboxymethyl cellulose or a salt thereof,
    the carboxymethyl cellulose or a salt thereof has a degree of etherification of 0.4 to 2.0, has a 2 mass% aqueous solution viscosity (at 25° C., with a B-type viscometer) of 1000 mPa·s or less, has a Printing Viscosity Index (PVI) value of 0.5 or less, and has a structural viscosity of 50 or more,
    a content of the carboxymethyl cellulose or a salt thereof is 4 mass% to 15 mass% relative to a total mass of the negative electrode active material layer, and
    a content of the silicon-based negative electrode active material is 3 mass% to 19 mass% relative to a total content of the carbon-based negative electrode active material and the silicon-based negative electrode active material, wherein
    the PVI value is defined by the following equation:

PVI Value=η20/η2, where η2 is viscosity measured at a rotation speed of 2 rpm, and η20 is viscosity measured at a rotation speed of 20 rpm,
    the structural viscosity is defined by the following equation:

Structural Viscosity (%)=(ηM−ηm)/ηM, wherein ηm is viscosity measured at a rotation speed of 20 rpm after stirring at 400 rpm for 10 minutes, and ηM is a viscosity measured at a rotation speed of 20 rpm before the stirring at 400 rpm for 10 minutes.

2. The nonaqueous electrolyte secondary battery negative electrode according to claim 1, wherein the carboxymethyl cellulose or a salt thereof is obtained by a method including the following steps:
    (step 1) a step of producing an alkaline cellulose from a cellulosic raw material by performing a reaction in a water-containing organic solvent (total amount: 100 mass%) containing 10 mass% to 15 mass% of an alkali metal hydroxide, using 1.0 mol to 5.0 mol of sodium hydroxide per mole of a glucose unit of the cellulosic raw material, at 30° C. to 40° C. for a time period of 50 minutes to 80 minutes;

(step 2) a step of etherifying the obtained alkaline cellulose by adding an etherifying agent at 30° C. to 40° C. for a time period of 50 minutes to 80 minutes, and performing an etherification reaction at 70° C. to 100° C. for 50 minutes to 120 minutes; and (step 3) a step of obtaining a carboxymethyl cellulose or a salt thereof by adding hydrogen peroxide to the carboxymethyl cellulose or a salt thereof obtained in the above steps 1 and 2 in a reaction system of pH 7.0 or higher, and reducing a viscosity at 80° C. to 120° C. for 80 minutes to 100 minutes.

3. The nonaqueous electrolyte secondary battery negative electrode according to claim 1, wherein the silicon-based negative electrode active material is one or more selected from silicon, a silicon alloy, and a silicon oxide represented by $SiO_x$ (wherein x represents $0.5 \le x \le 1.6$).

4. A nonaqueous electrolyte secondary battery, comprising:
a negative electrode;
a positive electrode;
a separator disposed between the negative electrode and the positive electrode; and
an electrolytic solution,
wherein the negative electrode is the nonaqueous electrolyte secondary battery negative electrode according to claim 1.

5. The nonaqueous electrolyte secondary battery negative electrode according to claim 2, wherein the silicon-based negative electrode active material is one or more selected from silicon, a silicon alloy, and a silicon oxide represented by $SiO_x$ (wherein x represents $0.5 \le x \le 1.6$).

6. The nonaqueous electrolyte secondary battery negative electrode according to claim 1, wherein the content of the carboxymethyl cellulose or a salt thereof is 6 mass% to 15 mass% relative to the total mass of the negative electrode active material layer.

* * * * *